Patented Dec. 27, 1938

2,142,007

UNITED STATES PATENT OFFICE 2,142,007

MANUFACTURE OF ARTIFICIAL SILK

Paul Schlack, Berlin-Treptow, Germany, assignor to I. G. Farbenindustrie Aktiengesellschaft, Frankfort-on-the-Main, Germany, a corporation of Germany No Drawing. Application September 20, 1935, Serial No. 41,500. In Germany September 20, 1934

12 Claims. (Cl. 18—54)

My present invention relates to the manufacture of artificial silk.

One of its objects is to provide a process by which the affinity for dyes of artificial threads made of organophil colloids is improved. Another object is the provision of artificial threads made of organophil colloids having incorporated substances imparting to the threads improved dyeing properties. Further objects will be seen from the detailed specification following hereinafter.

I have found that the dyeing properties of artificial silk and other formed products such as sheets, films, bands, bristles, and coatings made of organophil colloids, such as cellulose esters or ethers, polyvinyl-acetals, polyvinyl-acetal esters, polyesters, polyamides or mixtures of such bodies with polyacrylic acid esters, polymethylene ketones, heteropolymerizates from $\alpha$-$\beta$-unsaturated mono- or poly-carboxylic acid esters with styrene, vinyl chloride, vinylcyanide, or vinylalkyl ethers, can be improved by introducing into the mass to be spun or otherwise worked up synthetic products which contain alkylating groups, for instance, groups linked to reactive halogen, alkylene-oxide groups, sulfuric acid ester groups or sulfonic acid esters groups, and during or after the spinning or other forming operation, treating the thread or product with an amine, an amine derivative or another substance capable of forming basic groups by addition.

The number of substances which may be added in the process is considerable. The following are named by way of example:

1. Resins which can be obtained by condensation of halogenalkyl-arylsulfonamides with aldehydes, particularly with formaldehyde. The resins may be produced by heating halogenalkyl-arylsulfonamides with an aldehyde, for instance, formaldehyde to 100–120° C. in the presence of a small quantity of an organic acid, for instance, formic acid for several hours.

2. Salicylide-like resins which are produced by heating halogenalkyl derivatives of hydroxcarbonic acids, for instance, chloromethylhydroxy benzoic acids and their homologues with acetic acid anhydride or another acid condensing agent as described in German Patent 344,034.

3. Products of the reaction of hydroxyethylated "Novolacs" (registered trade-mark) with halogenacyl-chlorides. For the manufacture of such products the resins which cannot be hardened and are obtained by condensation of formaldehyde and phenol in the presence of an acid condensing agent, are treated in an alcoholic solution and in the presence of an alkali with ethylene oxide in slight excess at 60 to 80° C. The formed ethers are separated and boiled in an inert solvent, for instance, tetrachlorethylene with an $\alpha$-halogenacylchloride, preferably chloroacetic acid chloride or a corresponding acid anhydride, until the conversion is complete.

4. Halogenalkylethers of "Novolacs" (registered trade-mark). These compounds are obtainable as follows: By treating the hydroxyalkylethers obtainable as described sub 3 with inorganic acid chlorides, especially thionylchloride, if required in the presence of pyridine or another acid binding medium. The reaction is carried out at a relatively low temperature, for instance, at 60 to 80° C. in order to prevent a splitting of the ethers as far as poss.ble. By reaction of the alkali compound of the "Novolacs" (registered trade-mark) with an excess of a dihalogen compound in alcoholic solution. There is preferably used a considerable excess of dihalogen compound and preferably such alkylendihalogenides which contain halogen atoms of differing reactivity, for instance, 1-bromo-3-chloro-propane.

5. Products obtained by conversion of artificial resins containing an alcoholic hydroxyl group with dialkylaminosulfonic acid chlorides.

These compounds are easily obtainable by boiling the hydroxyl compound, for instance, the hydroxyalkylethers enumerated sub 3 with dialkylaminosulfonic acid chlorides, for example, dimethylaminosulfonic acid chloride in an inert solvent or a mixture of such solvents, for instance, ethylene chloride or a mixture of ethylene chloride and dioxane.

6. Resins obtainable by polymerization and containing halogenacyl radicals, for instance, polyvinylchloracetate, mixed polymerization products from vinylchloracetate and vinylchloride, polyglycidchloracetate.

Polyglycidchloracetate is obtainable by heating polyglycid in an indifferent solvent with chloroacetic anhydride.

7. Artificial resins containing the chlorohydroxypropylether group. These are obtainable by the reaction of epichlorhydrin on highly molecular polyhydroxy compounds, for instance, hydroxyethylated "Novolacs" (registered trade-mark) or a partially saponified polyvinylester of an organic acid, or the glycid ethers obtainable from chlorohydroxypropylethers by treatment with an acid binding agent.

For the production of the chlorohydroxypropylethers epichlorhydrin is caused to react on "Novolacs" (registered trade-mark) or partially saponified polyvinylacetates under pressure and in the presence of boric acid, dimethylsulfate, toluenesulfonic acid or a similar acid catalyst. A reaction temperature between 130 and 170 C. is applied.

8. Artificial resins obtainable by condensation from polybasic acids and polybasic alcohols and containing a radical of a halogen fatty acid.

For the production of such compounds there may be heated, for instance, a mixture of glycerol, phthalic acid or diglycolic acid and monochloracetic acid in an indifferent solvent, for instance, tetrahydronaphthalene, until the desired degree of condensation is obtained. Alternatively a dibasic acid may be condensed with the polybasic alcohol and the free hydroxyl group may be esterified with halogen acetic acid or a functional derivative thereof. The halogenacyl radical may also be linked to nitrogen.

9. Halogenated artificial resins from polyalkylbenzenes and formaldehyde, for instance, products of the kind described in German Patent 542,778.

In the choice of the substance in question there must be considered in the first place its compatability with the other components of the mass to be formed; in particular when artificial fibers are to be manufactured. If a molecule of the addition corresponds in considerable degree with the degree of polymerization and with the size of a molecule of the particular spinning material or approximates thereto, the addition in some cases may be made in comparatively large proportions. If, however, the molecular size, as is usually the case, is essentially smaller than that of the spinning material, the addition must be kept within moderate limits, for example between 5 and 15 per cent. of the weight of the fiber. On this account, in such a case, the body selected should be as rich as possible in active groups. The mixture of solvents is advantageously so selected that during the drying or solidification of the product in the precipitating bath no pronounced precipitating effect occurs within it, so far as it is not desired to produce a matt effect simultaneously. If, therefore, precipitating agents are present in the mixture, which evaporate more slowly, it is advantageous to add a solvent of still higher boiling point and, if desired, also non-volatile softening agents.

For the reaction with the added substances are available many basic bodies; such bodies are ammonia, monomethylamine, diethylamine, piperidine, morpholine, tetramethylmethylenediamine, ethylenediamine, as-dimethylethylenediamine piperazine, ethyleneimine, triethylamine, dimethylisohexylamine, pyridine, dimethylamino-acetic acid ethylester, dimethylmetaxylylenediamine, para-acetaminobenzyl-dimethylamine, ω-dimethylaminoacetanilide, salicyldimethylamino-ethanol, isoquinoline, dimethylaniline, hexamethylene-tetramine, for instance, ethylene thiourea.

To produce the reaction between the added substance and the amine, amine-derivative or the like, the threads, fabrics, films or other formed bodies may be treated at a suitable temperature with a solution of the amine in an indifferent liquid, the treatment being continued until the reaction is finished. In order to accelerate this there may be added to the liquor dissolving or swelling components in adjusted proportion. It is best to operate in a closed apparatus similar to the known dyeing apparatus having constant circulation of the liquor. It is frequently advantageous to add the amine gradually in the proportion in which it is consumed in the liquor.

When the halogen is sufficiently reactive amines of relatively low molecular weight, for instance ammonia, dimethyl amine, trimethylamine, triethylamine, pyridine or the like may be caused to react in the form of vapor on the fibers or films, in which case one may work under raised pressure or reduced pressure. In general however, care must be taken that no condensation of the vapor occurs on the goods under treatment. Instead of the amines, salts thereof capable of dissociation may be used, in particular carbonates, at temperatures at which there is already a considerable degree of dissociation. The treatment in which a gaseous amine is used can be assisted by a preliminary swelling or by the simultaneous action of vapors which produce swelling. In order to exclude the effect of atmospheric oxygen, before the action of the gas occurs, the air may be evacuated or may be displaced by an inert gas, such as nitrogen. It is also possible to conduct the operation in the presence of the substance which has a reducing action or a substance that binds oxygen, for example, an addition of formaldehyde is recommended. Formaldehyde may also serve for binding primary or secondary bases present as constituents in tertiary technical amines. Any yellowing which may develop during the treatment may be removed by a bleaching agent, for example by hypochlorous acid or one of its organic derivatives. The treatment may be carried out from the first in the presence of a bleaching agent. As the speed of the reaction and the penetration of the reagent is affected by the swollen condition of the fiber it is advantageous that the operation should be conducted in the presence of moisture. For instance, when trimethylamine is used it is useful that there should be present a relative moisture of the atmosphere amounting to 75 per cent.

The chemical reaction may in many cases occur simultaneously with or directly after the forming of the mass; for example an amine may be incorporated in the spinning solution used for making artificial thread directly before delivery from the spinning nozzle or in the precipitating bath or may be added to the stream of drying gas intended to take up the solvent. It may also, in suitable dilution, be sprayed on to the formed goods, or, especially in the dry spinning process, added to the usual preparations.

Another, frequently advantageous, modification of the process consists, especially when relatively non-volatile amines and particularly amines which are soluble only moderately or not at all water-soluble are used, to permit such amine to be taken up from aqueous liquors, padding solutions or printing pastes applied to the formed material. In this manner, not only textile fabrics, but also unprepared yarn may be treated locally. Under some conditions such treatments may be combined with a dyeing operation.

The amine material which is prepared must be selected from case to case; if, for example, halogen is linked to an ester-like bound acyl-radical the use of tertiary or secondary amines is indicated in order to avoid a partial saponification which would weaken the effect.

If the solutions contain compounds with easily hydrolyzable halogen, for instance the halogen in aromatic chlormethyl-compounds, it is advantageous, in order to avoid the danger of corrosion and injurious decomposition to add an alkylene oxide, for instance propylene oxide, cyclohexene oxide, phenoxypropene oxide. The addition of an alkylene oxide is also of importance since it affords an agent for binding nitrogen, for example, if the reaction occurs with gaseous ammonia or by the action of a precipitating bath containing salts and free ammonia. The non-volatile or difficultly volatile hydroxyamines produced by the interaction of ammonia and alkyleneoxides subsequently react with the more unreactive additions of high molecular weight. If this action is intended, the addition of alkylene oxides of low molecular weight is not limited to those cases in which halogen compounds are present in the formed products.

The formed objects made by the invention have essentially altered dyeing properties, as compared with the normal products made without aftertreatment and without the additions. The affinity to many acid dyestuffs which by themselves are only feebly or moderately absorbed, is extraordinarily increased, so that with most of these dyestuffs full, deep dyeings with, in part, remarkably good properties of fastness may be obtained. Moreover, many dyestuffs may be used with good results which hitherto have not come into question even for light dyeings. Finally, the fastness to acid industrial gases of dyeings of aminoanthraquinones, for instance 1.4-dimethylaminoanthraquinone, is in some cases essentially improved.

Particularly important are the improvements in printing. In this case, for example, the choice of dyestuffs fast to sublimation is increased, the range of applicability of the indigosols is expanded and the production of bottom dyeings which are thoroughly capable of discharge is facilitated. Valuable effects can easily be obtained by printing or spraying the amine locally on the goods. It is then possible, according to the choice of dyestuffs, to produce tone-in-tone effects or two-color effects. In the case of cellulose ester products, by applying partial local saponification it is possible to arrive at a singlebath three-color effect. The improved affinity for dyes is not restricted to acid dyestuffs. Many dyestuffs usually used in disperse condition, particularly such as normally show only a poor tendency to dye, are quickly absorbed, and in some circumstances even in large proportion. The enhanced rapidity of fixing is of particular importance in direct printing as the steaming time can be considerably shortened.

The following examples illustrate the invention, the parts being by weight:

Example 1.—A spinning solution, consisting of 21.6 parts of cellulose acetate, having 54.5 per cent. of acetic acid, 2.5 parts of polyvinylchloracetate, 76 parts of a mixture of methylenechloride and methanol in the ratio 85:15, is spun by the dry-spinning process. There is obtained an acetate artificial silk with normal constants. The silk (10 parts) is, in the form of wound yarn, treated for 3 hours at 90° C. in a closed apparatus with a rapidly circulating solution of 1 per cent of pyridine in toluene. When the reaction is complete, the excess liquid is centrifuged and the silk after-treated with an acid preparation agent, for example a formic acid solution of palmityltriethanolamine. Instead of the after-treatment, there may be added to the solution used in the treatment a soluble softening agent, for instance the sodium salt of the sulfopalmitic acid-butyl ester, if desired in presence of a fatty oil. The silk thus obtained can be dyed with acid dyestuffs, such as Orange II, Alizarine Direct Blue A and similar dyestuffs, in very intense dyeings.

Example 2.—18 parts of an acetyl cellulose of acetic acid content of 53.8 per cent and 2 parts of the resin obtained from a mixture of chloromethylsalicyclic acid and the isomeric chloromethylcresotinic acids, by heating such mixture with acetic anhydride or thionyl chloride, are dissolved in 80 parts of a mixture of methylene chloride, ethyl alcohol and dioxane in the ratio 75:15:10, and the solution is spun by dry spinning process. The fibers thus obtained are treated with an excess of triethylamine in toluene solution for 3 hours at 80° C. The fibers cut to staple can be worked up to yarn together with wool. The yarn can be dyed with acid dyestuffs, such as Alizarine Direct Blue A, the tints being comparatively uniform.

Example 3.—A spinning solution containing 18 parts of acetyl cellulose, 2 parts of the resin obtainable by heating para-chloromethylbenzenesulfamide and formaldehyde in presence of formic acid, 0.5 part of phenoxypropenoxide and 80 parts of the solvent mixture specified in Example 2 is spun by a dry spinning process. The silk, in the form of skeins, is treated with an aqueous dispersion of 6 per cent. strength of ω-dimethylamino-p-methoxyacetanilid at 60 to 70° C.; it is then dried and heated for 2 hours at 90 to 100° C. The silk then shows good affinity to acid dyestuffs.

Analogous effects are obtained with printing pastes containing the diethylaminoacetomorpholide.

Example 4.—A "Novolac" (registered trademark) obtained from phenol and formaldehyde in the presence of aqueous hydrochloric acid is steam-distilled for separating the volatile portions and etherified by means of 1.2 molecular proportions of ethylene oxide per one molecular proportion of phenylhydroxyl, in known manner. By boiling this product with toluene sulfochloride in toluene there is obtained a toluenesulfonic acid-ester which is freely soluble in a mixture of methylenechloride and methanol. When this product is added to an acetate spinning solution in the proportion of 10 per cent. of the cellulose-acetate in the solution, there is obtained, by dry or wet spinning, a silk which at raised temperature freely attaches pyridine, and then is capable of being dyed with acid dyestuffs intense and fast colors. Amination is carried out with a solution of 2 per cent of pyridine in toluene at 90° C. The product is also capable of combining with ethyl-cellulose.

Example 5.—To a crude solution of acetylcellulose in acetic acid there is added polyvinylchloracetate in the proportion of 8 per cent. of the acetyl-cellulose. The solution is spun by the wet spinning process. The silk thus obtained is heated at 50° C. for 8 hours in a closed vessel with a mixture of triethylamine vapour and air in presence of 75 per cent. of relative atmospheric moisture; it then shows a strong affinity to acid dyestuffs. For instance, the dye of a dyeing bath containing 8% of Orange II (Schultz Farbstofftabellen, 7th edition, No. 145) is practically consumed.

Example 6.—A solution consisting of 13 parts of cellulose acetate containing 54% of bound acetic acid, 2 parts of polyvinylformal and 2 parts of polyvinylchloracetate dissolved in 68 parts of methylene chloride, 5 parts of methanol and 10 parts of methylglycol is cast to thin films. These films obtain an affinity to acid dyes if heated at 70° C. for 16 hours in a chamber containing 0.8 molecular proportions of diethylamine on 1 molecular proportion of vinylchloracetate.

Example 7.—A solution containing 82 parts of cellulose acetate, 15 parts of polyvinylchloracetate and 3 parts of titandioxide in 600 parts of acetone is used for coating electric bulbs by immersion. The coated bulbs are dried and then stored at 80° C. for 12 hours in a chamber in which an excess of pyridine is evaporated. The bulbs can then be dyed any tint at a moderate temperature with acid dyes which are fast to light and to moisture.

Example 8.—A solution of 14% of polyvinylchloride which has been rendered soluble in acetone by after-chlorination and 6% of polyvinylchloracetate, the balance being acetone is cast to films. The films are heated at 70° C. for 16 hours in a closed vessel with 3 molecular proportions of pyridine vapour calculated on the bound chloracetyl. The films thus treated can be dyed with acid dyes, for instance, Alizarine Direct Blue A.

What I claim is:

1. A process of producing artificial fibers and films having an increased affinity for dyes which comprises adding to the solution of an organophil colloid an artificial resin containing an alkylating group, forming the product from said solution, and treating the formed product with a compound selected from the group consisting of amines and amine derivatives.

2. A process of producing artificial fibers and films having an increased affinity for dyes which comprises adding to the solution of an organophil colloid a mixture of artificial resins containing an alkylating group, forming the product from said solution, and treating the formed product with a compound selected from the group consisting of amines and amine derivatives.

3. A process of producing artificial fibers and films having an increased affinity for dyes which comprises adding to the solution of an organophil colloid a reactive alkyleneoxide and an artificial resin containing an alkylating group, forming the product from said solution, and treating the formed product with a compound selected from the group consisting of amines and amine derivatives.

4. A process of producing artificial fibers and films having an increased affinity for dyes which comprises adding to the solution of an organophil colloid an artificial resin containing an alkylating group, forming the product from said solution, impregnating the product with a compound selected from the group consisting of amines and amine derivatives substantially non-volatile at ordinary working temperature, and heating the impregnated product to a temperature lower than the temperature of decomposition of the impregnated product.

5. A process of producing artificial fibers and films having an increased affinity for dyes which comprises adding to the solution of an organophil colloid an artificial resin containing an alkylating group, forming the product from said solution, and treating said product with the vapor of a compound selected from the group consisting of amines and amine derivatives.

6. A process of treating artificial fibers and films having an increased affinity for dyes which comprises adding to the solution of an organophil colloid an artificial resin containing an alkylating group, forming the product from said solution, and treating locally said product with a compound selected from the group consisting of amines and amine derivatives.

7. A process of producing artificial fibers and films having an increased affinity for dyes which comprises adding to the solution of an organophil colloid an artificial resin containing an alkylating group, forming the product from said solution, and treating the formed product with a compound selected from the group consisting of amines and amine derivatives in the atmosphere of an inert gas.

8. A process of producing artificial fibers and films having an increased affinity for dyes which comprises adding to the solution of an organophil colloid an artificial resin containing an alkylating group, forming the product from said solution, and treating the formed product with a compound selected from the group consisting of amines and amine derivatives in the presence of a substance that binds oxygen.

9. Artificial fibers and films made of an organophil colloid, said organophil colloid containing the product of reaction of polyvinylchloracetate and a member of the group consisting of amines and amine-derivatives.

10. Artificial fibers and films made of an organophil colloid, said organophil colloid having incorporated a resinous nitrogen-containing component being the product of reaction between an artificial resin containing an alkylating group and a compound selected from the group consisting of amines and amine derivatives.

11. Artificial fibers and films made of an organophil colloid, said organophil colloid having incorporated a resinous nitrogen-containing component being the product of reaction between an artificial resin containing a halogen acyl group and a compound selected from the group consisting of amines and amine derivatives.

12. Artificial fibers and films made of an organophil colloid, said organophil colloid having incorporated a resinous nitrogen-containing component being the product of reaction between an artificial resin containing a chloroacetyl group and a compound selected from the group consisting of amines and amine derivatives.

PAUL SCHLACK.